United States Patent
Nihlstrand et al.

(10) Patent No.: US 9,725,633 B2
(45) Date of Patent: Aug. 8, 2017

(54) MULTI-COMPONENT FIBRES

(75) Inventors: Anna Nihlstrand, Mölndal (SE); Inge Gabrielii, Västra Frölunda (SE); Bengt Hagström, Göteborg (SE)

(73) Assignee: SCA HYGIENE PRODUCTS AB, Gothenburg (DE)

( * ) Notice: Subject to any disclaimer, the term of this patent is extended or adjusted under 35 U.S.C. 154(b) by 1447 days.

(21) Appl. No.: 12/673,839

(22) PCT Filed: Sep. 3, 2007

(86) PCT No.: PCT/SE2007/000769
§ 371 (c)(1),
(2), (4) Date: Feb. 17, 2010

(87) PCT Pub. No.: WO2009/031946
PCT Pub. Date: Mar. 12, 2009

(65) Prior Publication Data
US 2011/0027568 A1    Feb. 3, 2011

(51) Int. Cl.
*D02G 3/00* (2006.01)
*D01F 8/00* (2006.01)
(Continued)

(52) U.S. Cl.
CPC ............... *C09K 5/063* (2013.01); *D01F 1/10* (2013.01); *D01F 8/06* (2013.01); *D01F 8/12* (2013.01);
(Continued)

(58) Field of Classification Search
CPC .................................. C09K 5/063; D01F 1/10
(Continued)

(56) References Cited

U.S. PATENT DOCUMENTS 4,908,166 A * 3/1990 Salyer .................... C08L 23/06
                                                        252/70
4,923,549 A * 5/1990 Warner .................... B32B 7/02
                                                      156/229
(Continued)

FOREIGN PATENT DOCUMENTS

EP         714939 A2 *  6/1996
EP    1 484 378 A1     12/2004
(Continued)

OTHER PUBLICATIONS

Dupont Fusabond E100 resins Product Data Sheet, Jan. 11, 2010, copyright E.I. du Pont de Nemours and Company, Inc., pp. 1-3.*
(Continued)

*Primary Examiner* — Hai Vo
(74) *Attorney, Agent, or Firm* — Buchanan Ingersoll & Rooney PC

(57) ABSTRACT

A multi-component fiber includes at least two elongated fiber bodies. A first fiber body consists of a first material including a phase change material and a second fiber body consists of a second material and encloses the first fiber body. The phase change material is non-encapsulated or in raw form and the first material includes a viscosity modifier selected from polyolefines having a density in the range of 890-970 kg/m$^3$ as measured at room temperature according to ISO 1183-2 and a melt flow rate in the range 0.1-60 g/10 minutes as measured at 190° C. with a 21.6 kg weight according to ISO 1133. Further, a textile, a fabric and an absorbent article include the multi-component fiber.

25 Claims, 7 Drawing Sheets

(51) Int. Cl.
*C09K 5/06* (2006.01)
*D01F 1/10* (2006.01)
*D01F 8/06* (2006.01)
*D01F 8/12* (2006.01)
*D01F 8/14* (2006.01)

(52) U.S. Cl.
CPC ....... *D01F 8/14* (2013.01); *Y10T 428/249921* (2015.04); *Y10T 428/2929* (2015.01)

(58) Field of Classification Search
USPC .............. 428/364, 221, 370, 372, 373, 374; 19/144; 252/70; 219/528
See application file for complete search history.

(56) References Cited

U.S. PATENT DOCUMENTS

| | | | |
|---|---|---|---|
| 7,160,612 | B2 | 1/2007 | Magill et al. |
| 7,241,497 | B2 | 7/2007 | Magill et al. |
| 2005/0106392 | A1 | 5/2005 | Sano et al. |
| 2005/0208300 | A1* | 9/2005 | Magill et al. ................ 428/364 |
| 2005/0233145 | A1 | 10/2005 | Abe et al. |
| 2007/0089276 | A1* | 4/2007 | Dugan et al. .................. 19/144 |

FOREIGN PATENT DOCUMENTS

| | | | |
|---|---|---|---|
| EP | 1 577 362 A1 | | 9/2005 |
| JP | 4-163370 A | | 6/1992 |
| JP | 2537313 B2 | | 9/1996 |
| JP | 8-311716 A | | 11/1996 |
| JP | 08311716 A | * | 11/1996 |
| JP | 2804147 B2 | | 9/1998 |
| JP | 2002-317329 A | | 10/2002 |
| JP | 2004-003087 A | | 1/2004 |
| JP | 2004-011032 A | | 1/2004 |
| JP | 2005-060896 A | | 3/2005 |
| JP | 2009-138122 A | | 6/2009 |
| JP | 2009-143079 A | | 7/2009 |
| JP | 2009-154332 A | | 7/2009 |
| WO | WO 02/24992 A1 | | 3/2002 |
| WO | WO 2006/086031 A1 | | 8/2006 |
| WO | WO 2007/035483 A1 | | 3/2007 |
| WO | WO 2007065644 A1 | * | 6/2007 |

OTHER PUBLICATIONS

Translation of JP-08311716, Nov. 26, 1996, p. 1-9.*
EMA, "Antiandrogenic Effects of Dibutyl Phthalate and its Metabolite, Monobutyl Phthalate, in Rats" Congenital Anomalies, 2002, vol. 42, pp. 297-308.
DuPont Industrial Polymers: Elvax® Grade Selection Guide, "For Molding, Compounding, and Extrusion" (2001) received form the internet on Sep. 19, 2001, (former) URL http://www.dupont.com/industrial-polymers/elvax/H-08772-1/H-08772-1.html, 7 pages.
DuPont Industrial Polymers: Elvax® Grade Selection Guide, "For Adhesives, Sealants, and Wax Blends" (1997) received from the Internet on Sep. 19, 2001, (former) URL http://www.dupont.com/industrial-polymers/elvax/H-19829-3/H-19829-3.html, 9 pages.
DuPont Industrial Polymers: Fusabond® Product Line received from the internet on Oct. 14, 2002, (former) URL http://www.dupont.com/industrial-polymers/fusabond/H-14007-3.html, 1 page.
Lin et al., "Experimental study of Under-Floor Electric Heating System with Sharp-Stabilized PCM Plates" Energy and Buildings, 2005, vol. 37, pp. 215-220.
DuPont Packaging & Industrial Polymers, DuPont™ Elvax® 350 EVA Resin complies with Food and Drug Administration Regulation, May 8, 2009, E.I. du Pont de Nemours and Company, Inc., 2 pages.
DuPont Packaging & Industrial Polymers, DuPont™ Elvax® 450 EVA Resin complies with Food and Drug Administration Regulation, May 8, 2009, E.I. du Pont de Nemours and Company, Inc., 2 pages.
Polyethylene FS1560 High Density Polyethylene for Film Extrusion (BOREALIS) Feb. 13, 2008, 3 pages.
DuPont Packaging & Industrial Polymers, DuPont™ Fusabond® E100, Jan. 11, 2010, E.I. du Pont de Nemours and Company, Inc., 3 pages.
Office Action dated Jul. 5, 2010, issued in the corresponding European Patent Application No. 07808789.7-2109 (PCT/SE2007000769).
International Search Report of Application No. PCT/SE2007/000769 dated May 12, 2008.
International Preliminary Report on Patentability of Application No. PCT/SE2007/000769 dated Nov. 11, 2009.
X. X. Zhang et al., "Effect of Phase Change Material Content on Properties of Heat-Storage and Thermo-Regulated Fibres Nonwoven", Indian Journal of Fibre & Textile Research, vol. 28, Sep. 2003, pp. 265-269.
Plastic Databook, p. 27, Dec. 1, 1999, Kogyo Chosakai Publishing Co., Ltd. (No English version available) 2 pages.
Office Action (Decision of Rejection) dated Mar. 12, 2013, issued in corresponding Japanese Patent Application No. 2010-522852, and an English Translation thereof. (8 pages).
Japanese Office Action (Notice of Reasons for Rejection) dated Jun. 2, 2014, issued by the Japanese Patent Office in corresponding Japanese Patent Application No. 2010-522852 (English language translation of Office Action only) (6 pages).

* cited by examiner

MULTI-COMPONENT FIBRES

TECHNICAL FIELD

The present invention relates to multi-component fibres comprising phase change material, textiles and fabrics (e.g. knitted, woven and nonwoven fabrics) comprising the multi-component fibres and absorbent articles comprising the multi-component fibres.

BACKGROUND

The thermo-regulating system of a human being aims to maintain a constant core temperature and skin temperatures within a range that varies between different body parts. Comfortable skin temperatures are within the range 28-33° C. Outside this temperature range, the body experiences discomfort.

The body controls the rate of heat exchange with the environment by regulation of the skin blood flow. Sweat production (evaporative heat loss) or shivering (heat production) sets in at larger deviations in body temperature.

The capacity and efficiency of the human thermo-regulating system is rather limited. Putting on or taking off clothes helps the body to stay within the comfortable temperature limits at different activity levels and ambient conditions for longer periods of time. However, it is not always appropriate or possible to put on or take off garments in a culturally acceptable way or it may be physically impossible or difficult. This applies particularly to garments like underwear or absorbent articles. Clothes and absorbent articles with built-in thermo-regulating properties would be able to maintain comfort without putting on or taking off clothes. Such clothing and absorbent articles would reduce discomfort caused by accumulation of sweat/moisture therein, and also shivering, which is rather unpleasant.

Integration of phase change materials (PCMs) in clothes is one way of achieving thermo-regulating properties. When skin temperatures increase, the PCM melts and absorbs heat released from the skin. Then, when the temperature drops, the PCM crystallizes and the stored heat is released again. In this way, variations in skin temperature can be suppressed and the temperature kept within the comfort zone. Not only products in the form of clothes and absorbent articles may benefit from incorporating PCM but also textiles used for e.g. for bed linen, pillow covers, blankets, furniture, car seats and footwear.

Textiles incorporating PCM may also be used in domestic and institutional applications like carpets and curtains in order to even out temperature fluctuations between day and night and thereby lower the energy costs for heating (night time) and air conditioning (day time).

The most common method of incorporating PCMs into textiles is by coating fabrics with a polymeric binder containing the PCM in microcapsules. The thermo-regulating effect is dictated by the coating weight. Further, the amount of microcapsules that can be added in the coating is limited, so the thermoregulating effect will be limited. In addition, applying microencapsulated PCM as part of a coating has several drawbacks besides the problem above and the high cost of microcapsules. Properties like air permeability and moisture permeability are impaired, which will affect the thermal comfort in a negative way. Further, increasing the add-on of coating results in a stiffer and less elastic fabric which is less comfortable to wear. Also surface properties like wetting may be negatively affected by the presence of a coating. This is especially important when dealing with training clothes or absorbent articles since a desired property of such articles is the ability of transporting bodily fluids on fibre surfaces.

The drawbacks associated with coatings can be avoided if the PCM microcapsules are incorporated inside the fibres. An added benefit is that the microcapsules are more durably bound to the fibres and can withstand laundering. Incorporation of microcapsules is possible in wet spun acrylic fibres and wet spun cellulose fibres but the thermal efficiency is rather low (less than some 10 to 30 J/g) since the amount of PCM that can be incorporated is restricted by factors such as spinability and sufficient fibre strength.

The dominating synthetic fibre used today is polyester, which is manufactured by means of melt spinning. Incorporation of microcapsules in standard meltspun fibres has so far been restricted for several reasons. The microcapsules must be able to withstand the high temperatures and shear forces encountered in the melt spinning process. Other reasons are the size of the capsules (1-10 μm) and the fact that particulate filler will increase the melt viscosity tremendously making melt spinning of thin fibres very difficult.

When one makes fibres with a content of PCM, it is the intention to obtain as high a thermo-regulating effect as possible per unit charge of PCM. In this perspective, the shell of the microcapsules is a ballast and an obstacle for energy transport. In order to achieve a fast exchange of energy between the skin of a human body and the PCM incorporated in a fibre, any unnecessary hindrance has to be minimized. Also, in order to load the fibrous material with as much PCM as possible, any unnecessary material component should be minimized.

If PCMs are to be used in melt spun fibres without being microencapsulated, that is, in a raw form, they have to be confined within the fibre. A solution is to use multi-component fibres with a core/sheath structure or a so called island-in-the-sea structure so that the PCM is trapped inside the fibres. However, a number of difficulties have to be overcome.

In "Effect of phase change material content on properties of heat-storage and thermo-regulated fibres nonwoven", Indian Journal of Fibre & Textile Research, Vol 28, September 2003, pp. 265-269, a method of spinning fibres, comprising phase change material in raw form is described. Core/sheath fibres were melt spun with n-eicosane (as PCM) and a blend of polyethylene and ethylene-propylene copolymer in the core. The sheath was made from polypropylene. The maximum PCM content tested was 21 wt-% and a latent heat of 32 J/g of fibres was reached. However, only some 50-60% of the theoretically possible latent heat was realised indicating that a significant portion of PCM in the fibre core did not participate to the melting/crystallisation.

Further, WO 02/24992 A1 mentions that PCM in raw form is used when spinning fibres. But the examples show the phase change material enclosed in microcapsules and no examples with non-encapsulated phase change material are disclosed.

WO 2006/086031 A1 mentions the use of modified forms of ethylene-propylene co-polymers and polar copolymers (e.g. ethylene-co-vinyl lacetate polymer) to facilitate the dispersion of the phase change material in the core material. Fibres having a high content of phase change material and high values of latent heat are not disclosed.

U.S. Pat. No. 7,160,612 B2 also mentions PCM in raw form can be used when spinning fibres. The latent heat and the strength of the fibres are not satisfactory.

US 2007/0089276 A1 describes melt spun multi-component fibres incorporating PCM in raw form. The latent heat is not disclosed.

U.S. Pat. No. 7,241,497 A1 discloses a multi-component fibre comprising thermo-regulating material dispersed therein. The latent heat and the strength of the fibres are not satisfactory.

Polymeric phase change materials have also been used for spinning fibres, but although such phase change material has a higher viscosity than low molecular hydrocarbon waxes and thereby may not need to be mixed with a viscosity modifier, they are not very efficient as they possess quite low values of latent heat.

Thus, there is a need for fibres comprising high amounts of phase change material, where the fibres have a high latent heat combined with a good mechanical strength. Such fibres have not yet been described.

There is thus a need to develop multi-component fibres comprising phase change material with a good latent heat effect and having high strength. It is the aim of the present invention to solve the above problems.

SUMMARY

The present invention relates to a multi-component fibre, comprising at least two elongated fibre bodies, wherein a first fibre body consists of a first material comprising a phase change material and a second fibre body consists of a second material and encloses the first fibre body. The phase change material is non-encapsulated or in raw form and the first material comprises a viscosity modifier selected from polyolefins having a density in the range of 890-970 kg/m$^3$ as measured at room temperature according to ISO 1183-2 and a melt flow rate in the range 0.1-60 g/10 minutes as measured at 190° C. with a 21.6 kg weight according to ISO 1133.

Further, the present invention relates to a textile material comprising the multi-component fibres.

A fabric comprising the multi-component fibres is also disclosed according to the present invention.

Further, the present invention concerns an absorbent article comprising the multi-component fibres.

SHORT DESCRIPTION OF THE FIGURES

FIG. 1 $a)$-$d)$ illustrates different embodiments of multi-component fibres in cross-section according to the invention.

FIGS. 2 and 3 show further embodiments of multi-component fibres in cross-section according to the invention.

FIG. 4 discloses a sanitary napkin according to an embodiment of the present invention.

FIG. 5 discloses a cross-section of the sanitary napkin in FIG. 4.

DEFINITIONS

Figure 1:
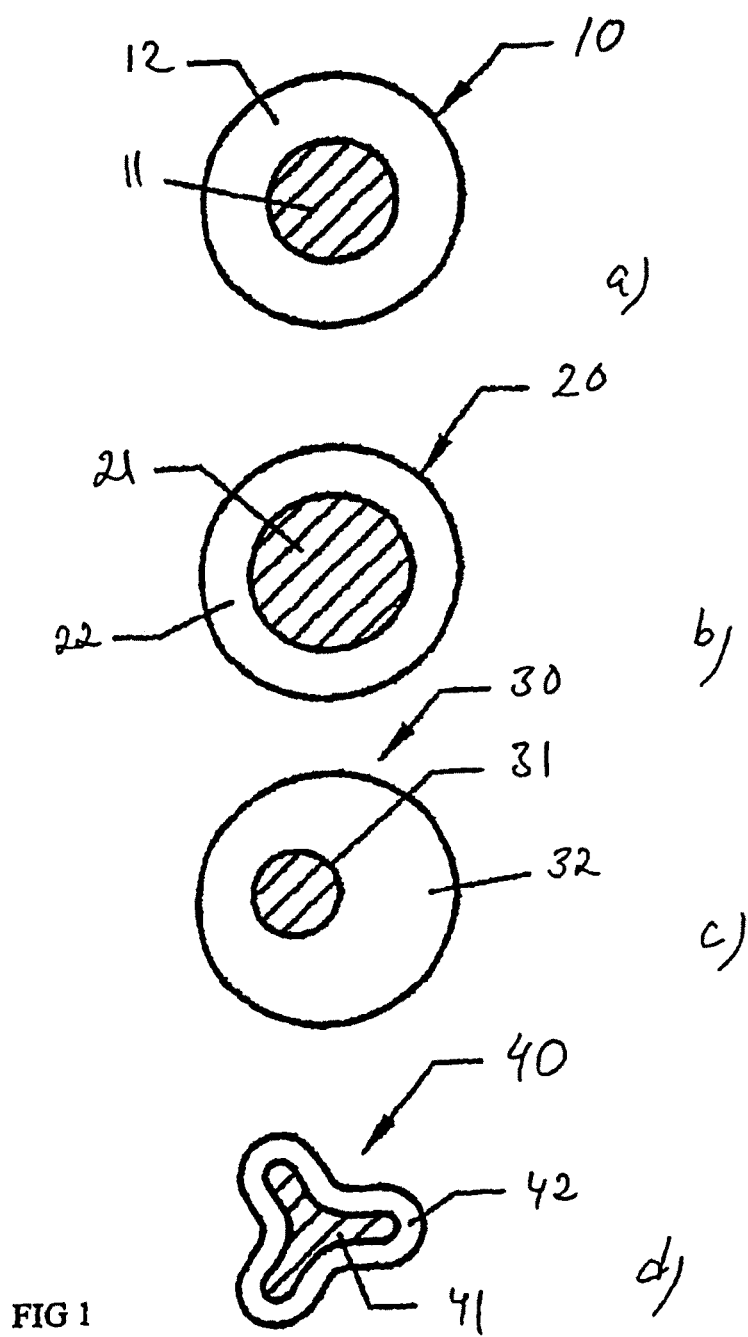

The draw ratio (DR) is defined as the velocity ratio (V2/V1) in the solid state drawing process, that is, DR=V2/V1. V1 is the filament speed after the melt drawing process. V2 is the speed after the solid state drawing process.

For a given material composition Titer is an indirect measure of the filament diameter and is expressed in units of gram per 1000 or 10000 meter of filament (Tex or dTex, respectively).

Tenacity is a measure of filament strength (maximum force sustained by the filament during the tensile test divided by the filament titer) and is expressed in units of cN/Tex.

Modulus is a measure of filament stiffness and is calculated as the force at 1% strain divided by the filament titer and is expressed in units of cN/Tex.

Melt flow rate, MFR, is an inverse indicator of molecular weight of a polymer. That is, for a given polymer, the MFR will decrease with increasing molecular weight.

By PCM efficiency is here meant the ratio obtained by dividing the heat of fusion of the first material comprising the PCM by the heat of fusion of the pure PCM and by the weight fraction of PCM in the first material comprising the PCM. The PCM efficiency is expressed in units of percent and is calculated using the formula:

$$\text{PCM Efficiency} = \Delta H_{mix}/(w_{PCM} * \Delta H_{PCM}) * 100$$

where $\Delta H_{mix}$ is the measured heat of fusion of the first material comprising the PCM (PCM+viscosity modifier) and $w_{PCM}$ is the weight fraction of PCM and $\Delta H_{PCM}$ is the measured heat of fusion of the pure PCM.

By thermal efficiency is here meant the ratio obtained by dividing the heat of fusion of the multi-component fibre by the heat of fusion of fusion of the pure PCM and by the weight fraction of PCM in the multi-component fibre comprising the PCM. The thermal efficiency is expressed in units of percent and is calculated using the formula:

$$\text{Thermal Efficiency} = \Delta H_{fibre}/(w_{PCM} * \Delta H_{PCM}) * 100$$

where $\Delta H_{fibre}$ is the measured heat of fusion of the multi-component fibre comprising the PCM and $w_{PCM}$ is the weight fraction of PCM and $\Delta H_{PCM}$ is the measured heat of fusion of the pure PCM.

A textile is a flexible material comprised of a network of natural and/or artificial fibers often referred to as threads or yarns. Yarn is produced by spinning raw wool fibers, linen, cotton, or other material on a spinning wheel to produce long strands known as yarn. Synthetic yarns are also available in the form of filament yarn. Textiles are formed by weaving, knitting, crocheting, knotting, or pressing fibers together. Textiles can be made from many materials. These materials come from four main sources: animal, plant, mineral, and synthetic.

A fabric is a textile material. The word fabric is commonly used in textile assembly trades (such as tailoring and dressmaking) as a synonym for textile. However, there are subtle differences in these terms. Textile refers to any material made of interlacing fibres. Fabric refers to any material made through weaving, knitting, crocheting, or bonding. Generally, fabrics can be said to be fibre-based products having a substantial surface extent in relation to their thickness. Nonwovens are also included in the definition.

Nonwoven fabrics are those which are neither woven nor knit, for example felt. They are typically manufactured by putting staple fibers together in the form of a sheet or web, and then binding them either mechanically (as in the case of felt, by interlocking them with serrated needles so that the inter-fiber friction results in a stronger fabric), with an adhesive, or thermally (by applying binder (in the form of powder, paste, or polymer melt) and melting the binder onto the web by increasing temperature). Other manufacturing techniques involve the direct thermal bonding of meltspun fibres. Spunlaid nonwovens are made in one continuous process. Fibers are spun and then directly dispersed into a web by deflectors or can be directed with air streams. Several variants of this concept are available. Spunbond has been combined with meltblown nonwovens, co-forming them into a layered product called SMS (spunbond-meltblown-spunbond). Meltblown nonwovens have extremely fine fiber diameters but are not strong fabrics. Spunlaid is thermally bonded or bonded using a resin.

In the following, the expression "core material" will sometimes be used instead of "first material" and "sheath material" will sometimes be used instead of "second material".

The expression "raw form" is intended to mean that the PCM is introduced in its raw form at the manufacturing of the multi-component fibre, i.e. that the PCM is not encapsulated, the PCM is neither carried on or by another material solid at the spinneret temperature during spinning of the multi-component fibre, such as soaked into a porous structure, wherein the structure is solid at the spinneret temperature during spinning of the multi-component fibre. Thus, the PCM is considered as in "raw form" in spite of it being mixed with the viscosity modifier at manufacturing the multi-component fibre.

DETAILED DESCRIPTION OF THE INVENTION

The present invention relates to multi-component fibres having a temperature regulating property by means of incorporating phase change material.

The multi-component fibres thus have the ability to absorb and release heat while maintaining a constant temperature. The multi-component fibres can be used in various articles to provide thermal regulating properties. Articles, such as clothes or absorbent articles, worn close to, or in contact with the skin of a user will give a comfortable feeling to the user. If, for example, a piece of clothing or a top sheet in an absorbent article comprises the multi-component fibres according to the present invention, the clothing or article may even out variations in the skin temperature so that it is kept within the comfort zone. Worn close to the body of a user, the multi-component fibers will help the user feel comfortable during varying physical activity, varying ambient conditions or when the skin temperature undergoes it's normal temperature fluctuations due to for example emotional influence or during circadian rhythm. If a top sheet in an absorbent article comprises the multi-component fibres according to the present invention, the article may absorb heat from the user making the user perspire less.

This is especially advantageous if a dense article with low vapor transmission is used in contact with the user's body, in order to avoid moisture against the skin of the user. Moisture on the skin of a user is a problem with regard to both absorbent articles and textile materials, which may lead to skin problems.

The present invention thus relates to a multi-component fibre 10, as shown in FIG. 1, comprising at least two elongated fibre bodies 11, 12, wherein a first fibre body 11 consists of a first material comprising a phase change material and a second fibre body 12 consists of a second material and encloses the first fibre body 11, wherein the phase change material is in raw form and the first material comprises a viscosity modifier selected from polyolefines having a density in the range of 890-970 $kg/m^3$ as measured at room temperature according to ISO 1183-2 and a melt flow rate in the range 0.1-60 g/10 minutes measured at 190° C. with 21.6 kg weight according to ISO 1133.

The expression "raw form" is intended to mean that the PCM is introduced in its raw form at the manufacturing of the multi-component fibre, i.e. that the PCM is not encapsulated, the PCM is neither carried on or by another material solid at the spinneret temperature during spinning of the multi-component fibre, such as soaked into a porous structure, wherein the structure is solid at the spinneret temperature during spinning of the multi-component fibre. Thus, the PCM is considered as in "raw form" in spite of it being mixed with the viscosity modifier at manufacturing the multi-component fibre.

It has been found that polymers having a melt flow rate in the range 0.1 to 60 g/10 minutes measured at 190° C. with 21.6 kg weight are suitable as viscosity modifiers in the multi-component fibre. Many of the efficient PCM materials are low molecular compounds and such compounds possess low viscosities at the relevant processing temperatures (180-300° C.). In order to make multi-component fibres with a sheath material, the second material, having a higher viscosity at the processing temperature, the inventors have now found that if the phase change material is mixed with a polyolefin having a melt flow rate in the range 0.1-60 g/10 minutes, a fibre having high latent heat and which is strong is obtained. The polyolefin is a viscosity modifier, which increases the viscosity of the first material of the multi-component fibre. It has been found that a low amount of a viscosity modifier having a melt flow rate in the range 0.1-60 g/10 minutes may be used, which is an advantage for the thermal efficiency in terms of specific latent heat and at the same time allow the full utilisation of the inherent specific latent heat of melting/crystallisation of the phase change material. If a higher value than 60 g/10 minutes is used, the viscosity will be too low and the mixture will not be possible to process a fibre. The mixture will be "watery", i.e. very thin. A value lower than 0.1 g/10 minutes of the viscosity modifier might lead to curling of the fibres and fibre spinning may not be possible.

Other disadvantages with using low viscosity materials in melt spinning, such as back flow and leakage in screw extruders and gear pumps, are also avoided when mixing the phase change material with a polyolefin having a melt flow rate in the range 0.1-60 g/10 minutes. Then the first material will have a viscosity high enough to process at the process temperature.

Further, the viscosity modifier may have a density greater than 920 $kg/m^3$, preferably greater than 950 $kg/m^3$ measured at room temperature according to ISO 1183-2.

The phase change material is compatible with the viscosity modifier in the melt, while it separates into a pure phase upon cooling. It is beneficial to use a viscosity modifier with a high density. The effect of the modifier would be higher and a lower amount would be needed. This leads to a more efficient use of the inherent specific heat of fusion per gram of phase change material. A PCM efficiency as high as or greater than 90% can be obtained, as disclosed in Example 2.

The viscosity modifier may have a melt flow rate in the range of 0.1-50 g/10 minutes, preferably 0.1-20 g/minutes, more preferably 0.1-10 g/10 minutes as measured at 190° C. with a 21.6 kg weight according to ISO 1133. The lower the melt flow rate which is used for the viscosity modifier, the less amount of viscosity modifier is required to bring the viscosity of the first material comprising the phase change material up to a level adequate for the processing of the first material into a multi-component fibre. This is also shown in Example 1 below. Further, it is disclosed in Example 1 that an MFR lower than 10 g/10 minutes was enough to lower the concentration to less than about 30 wt-% of the viscosity modifier in the first material to increase the viscosity into the range of standard polymer grades used for melt spinning of fibres. The first material can further comprise additives which are conventional to use when producing fibres. Additional, a compatibilisator could be included in the first material in order to improve the boundary layer between the first and second fibre bodies.

The phase change material may have a latent heat of at least 100 J/g and preferably at least 140 J/g. These values are good in order to obtain fibres having a latent heat which is efficient and which will give the thermo-regulating effects.

Further, the first material comprising the PCM may have a PCM efficiency, as measured by the ratio $\Delta H_{mix}/(w_{PCM}*\Delta H_{PCM})*100$, which is at least 90 expressed in %, preferably at least 95%. A high PCM efficiency means that the PCM is utilised in an efficient way. The high efficiency is obtained by for example the density of the viscosity modifier and the MFR of the viscosity modifier.

Further, the multicomponent fibre comprising the phase change material may have a thermal efficiency, as measured by the ratio $\Delta H_{fibre}/(w_{PCM}*\Delta H_{PcM})*100$, which is at least 60 expressed in %, preferably at least 70, more preferred at least 75. A high thermal efficiency means that the PCM is utilised in an efficient way. The high efficiency is obtained by for example the density of the viscosity modifier, the MFR of the viscosity modifier and the choice of the second material.

Further, the viscosity modifier is present in less than 50% by weight, preferably less than 40% by weight and more preferably less than 30% by weight, calculated on the total weight of the first fibre body. When the amount of viscosity modifier can be kept low, a high latent heat can be obtained in the core. This may depend on the MFR value and the density of the viscosity modifier.

The PCM may be present in more than 50% by weight, preferably more than 60% by weight and more preferably more than 70% by weight, calculated on the total weight of the first fibre body, in order to obtain a high latent heat.

The first material comprises a phase change material and a viscosity modifier in the amount of at least 90% by weight together, calculated on the total weight of the first material. The inventors have found that no extra elements in the first material are necessary in order to obtain the fibres. This is possible since not encapsulated materials or no other carrying materials, such as porous structures, wherein the PCM is absorbed, are not necessary.

According to the present invention, the phase change material is selected from hydrocarbon waxes with a melting point in the range 20-50° C., preferably in the range 25-45° C., and more preferably in the range 27-40° C. These temperatures are suitable when considering thermo-regulating material used for thermo-regulation of the environment in proximity or in close contact of the human skin.

The phase change material is selected from linear hydrocarbon waxes. Preferred hydrocarbon waxes are n-Octadecane, n-Nonadecane, n-Eicosane, n-Heneicosane or mixtures thereof. These waxes have melting points which are suitable according to the present invention. These hydrocarbon waxes have heats of fusions around 200 J/g in their pure form. However, for economical reasons it may be preferred to use less pure materials, having lower heats of fusion but being significantly cheaper.

The viscosity modifier may be polyethylene. The viscosity modifier is soluble in the phase change material at temperatures above the melting point of the viscosity modifier, which polyethylene is. Further, very good results have been obtained for multi-component fibres comprising a polyethylene viscosity modifier. The polyethylene may have a density greater than 950 kg/m$^3$. This is good for the phase separation of the phase change material from the viscosity modifier as disclosed above.

The multi-component fibre has a latent heat of at least 20 J/g, preferably at least 30 J/g, and most preferred at least 40 J/g, as measured with a DSC-method in the range 0° C.-50° C.

The fibre will have strength greater than 10 cN/tex, preferably greater than 15 cN/tex and most preferably greater than 20 cN/tex. These strengths are very good for multi-component fibres comprising phase change material. Since a high latent heat can be obtained in the core, i.e. the first material, the core may constitute a less part of the fibre and the sheath can be thicker, which make the fibre stronger. Thus, the high efficiency of the latent heat of the PCM in the multi-component fibre and the low concentration of viscosity modifier in the first material in order to achieve adequate melt processing according to the present invention makes it possible to obtain strong fibres.

According to the present invention there is also disclosed a multi-component fibre, wherein the ratio between the viscosity of the first material and the second material fulfils the condition 0.1<Viscosity 1/Viscosity 2<10, where Viscosity 1 is the complex viscosity at the angular frequency of 10 rad/s of a first material comprising PCM and Viscosity 2 is the complex viscosity at the angular frequency of 10 rad/s of the second material, wherein the viscosities are measured at the extrusion temperature used during melt spinning, i.e. the set temperature of spinneret die.

With this relationship it is possible to produce multi-component fibres in a spinneret. Problems with co-extrusion, pressurizing and pumps with devices such as screw extruders and gear pumps are avoided by the condition above. Since the phase change material has a low viscosity, the viscosity modifier increases the viscosity of the first material, thus making it possible to reach the value defined above and thereby making it possible to produce multi-component fibres. The choice of the PCM and viscosity modifier and the second material according to what is disclosed in the present description will lead to the viscosity relationship as disclosed.

The multi-component fibre may also comprise a second material which is a fibre forming polymer that does not dissolve in the phase change material at temperatures above the melting point of the fibre forming polymer or the softening point, in case of an amorphous polymer. The efficiency of the PCM may then also be higher, since the PCM will be utilized in a higher degree if not disturbed by the presence of the second material dissolved in the phase change material. If the second material does not dissolve in the phase change material, the phase change material does not dissolve in the second material. This will avoid problems related to migration of low molecular PCM. Such problems might be smell, loss of PCM (also during washing/laundry of objects comprising the multi-component fibres) and sticky/greasy fibre surfaces.

For all multi-component fibres, produced in the examples, the thermal efficiency of the multi-component fibres was more than 70%, except where the second material was polypropylene. In the fibres wherein the second material was polypropylene, the efficiency was lower. However, such fibres are very good compared to what has been possible to produce up to this day of this kind. The lower efficiency might depend on that the polypropylene could be dissolved in the phase change material. This could also lead to some leakage of the phase change material. This could be a problem for fabrics used in for example clothing, which will be washed and used for a longer time. However, when the fibres are used in disposable articles, this is not necessarily a problem.

For applications of the multi-component fibres of the invention in objects that need regular laundering (e.g. garments and domestic textiles), it can be assumed that a continued migration of PCM out from the fibres will severely affect their thermal efficiency over time and laundering cycles. For disposable objects (e.g. napkins) migration of PCM might be a negligible problem.

The second material may comprise polymers selected from polyesters, such as polyethylene terephthalate, polybutylene terephthalate, polytrimethylene terephthalate, polylactic acid; polyamides, such as PA-6, PA-66; PA-11 and PA-12; polycarbonate, polyoxymethylene, polyacrylates (e.g. PMMA), polyvinylidene difluoride or polypropylene. Apart from polypropylene, these polymers do not dissolve in the phase change material, which is an advantage for the fibres. For example, migration and leakage of the phase change material is avoided. Any of the preferred second materials may be combined with any of the preferred phase change materials and viscosity modifiers.

The fibre may comprise at least one or more first fibre bodies and at least one or more second fibre bodies. Any of the first materials and second materials can be used in the first or second fibre bodies. The first materials may have different composition, which the second materials also may have.

The present invention also relates to a textile material, comprising a plurality of multi-component fibres as disclosed in the present description. The textile material may have latent heat of at least 10 J/g and preferably of at least 20 J/g.

Further, the present invention relates to a fabric, comprising multi-component fibres as disclosed in the present description. The fabric may have latent heat of at least 10 J/g and preferably of at least 20 J/g.

Further, the present invention relates to an absorbent article comprising fibres as disclosed in the present description. The fibres used in the textile, fabric or the absorbent article may have any of the properties as disclosed above.

Figure 2:
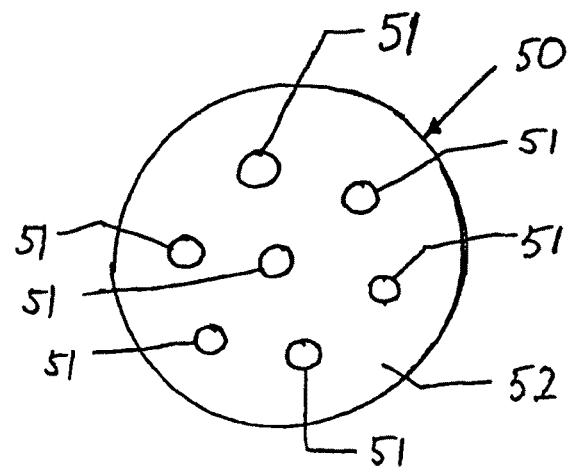
Figure 3:
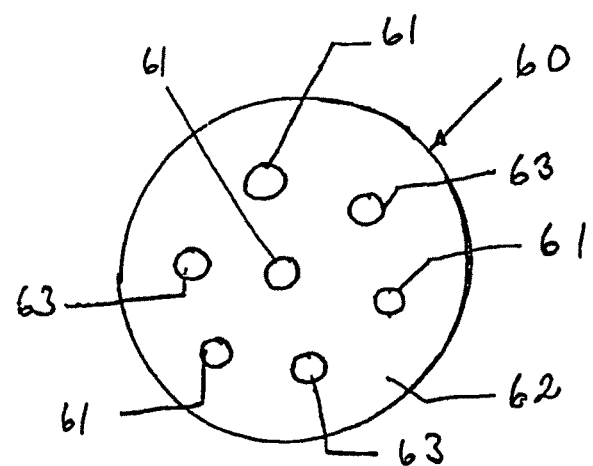

Several embodiments of multi-component fibres are shown in FIGS. 1-3. The elongated fibre bodies may be arranged in different configurations. Core/sheath fibres are for example shown in FIG. 1 *a*)-*d*), wherein the cross-section of the fibres is shown. Various multi-component fibres 10, 20, 30 and 40 are shown. A first fibre body, i.e. a core 11, 21, 31 and 41 is shown and is enclosed by a second fibre body 12, 22, 32 and 42, i.e. a sheath is surrounding and enclosing the core 11, 21, 31 and 41. However, further embodiments comprising more than one first fibre body and/or more than one second fibre body is also encompassed by the present invention. In FIG. 1 is circular and trilobal cross-sectional shapes of the fibres disclosed. According to the present invention, a variety of other regular or irregular cross-sectional shapes are also encompassed by the present invention. Such shapes could be for example oval, rectangular, square-shaped, multi-lobal, pentagonal, trapezoidal, triangular, wedge-shaped etc. Moreover, the shape of the first fibre bodies may also have the shapes as disclosed for the fibres above.

The multi-component fibre 10 in FIG. 1 *a*) will now be described further, illustrating all embodiments of FIG. 1 which are similar to each other. The first fibre body 11 is arranged in the fibre and is enclosed by the second fibre body 12. The first fibre body 11 consists of a material comprising a phase change material. The first fibre body 11 forming the core is concentrically positioned within the second fibre body forming 12 the sheath. FIG. 1 *b*) illustrates a similar fibre, but the core 21 is larger compared to the core 11 in FIG. 1 *a*). The core 31 in FIG. 1 *c*) is eccentrically positioned within the second fibre body 32. The fibre 41 in FIG. 1 *d*) is trilobal in shape.

In FIG. 2 is a multi-component fibre 50 disclosed wherein the first fibre bodies 51 are arranged in an island-in-sea configuration. Thus, more than one first fibre body is disclosed in this embodiment. A second fibre body 52 encloses the first fibre bodies 51 which form "islands" in the second fibre body, i.e. the "sea".

One or more additional fibre bodies enclosing the first fibre body consisting of a material comprising a phase change material may also be involved in a multi-component fibre according to the present invention. The additional fibre bodies may consist of the same or different material.

The multi-component fibre in FIG. 3 is an example which comprises at least a third fibre body additional to at least one first fibre body and at least one second fibre body. The fibre comprises first fibre bodies 61 consisting of a first material and a second fibre body 62 consisting of a second material. Further, the fibre comprises third fibre bodies 63 consisting of a third material. The third fibre bodies are also enclosed by the second fibre body 62. The third material may also comprise a phase change material and a viscosity modifier. Different phase change materials and viscosity modifiers may be used in the first and third material. The third material may be chosen according to the features as defined above for the first material. However, the features are not the same for the first and third material used in the same multi-component fibre. All embodiments above may comprise the materials as defined above for the multi-component fibres.

If the multi-component fibres need to be stronger, additives such as nanoclays could be incorporated in the second material. The nanoclay works as a reinforcing material. An additional benefit of incorporating nanoclay in the second material is that the permeability to low molecular compounds can be reduced (tortuous path for diffusion). That is, lower migration of PCM through the second material.

Further, the present invention relates to an absorbent article, such as a diaper, a sanitary napkin, an incontinence article, a panty liner, bed protector etc, comprising multi-component fibres according to above. The multi-component fibres could be used in a nonwoven material, for example used as a top sheet in an absorbent article. This will give a comfortable feeling to the user.

Figure 4:
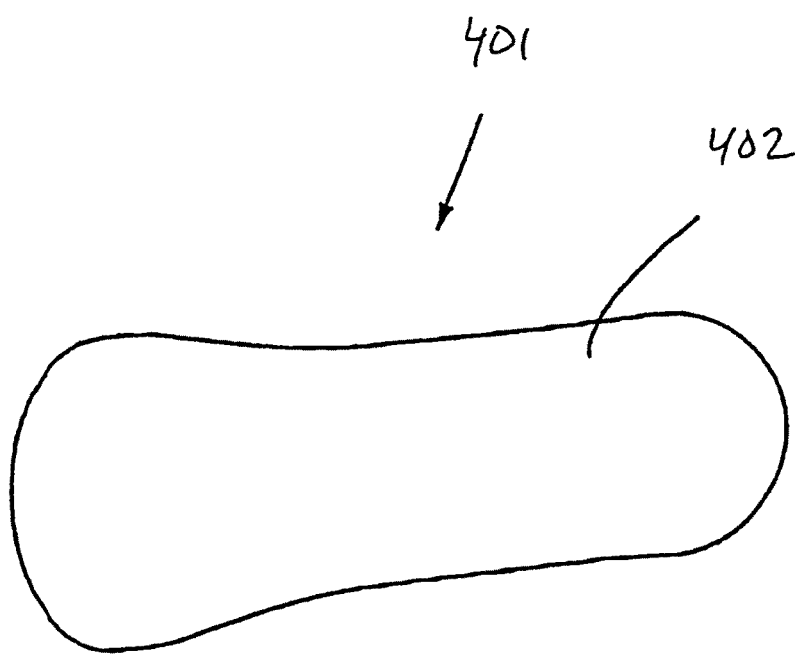

The absorbent article may comprise a nonwoven material as a top sheet, wherein the nonwoven material comprises multi-component fibres according to the present invention, and further a bottom sheet and possibly interjacent layers as described below. An embodiment in the form of a sanitary napkin 401 is illustrated in FIG. 4, wherein the sanitary napkin comprises a nonwoven material comprising multi-component fibres according to the invention as a top sheet 402. Also included is a bottom sheet, which is not shown here, and possibly interjacent layers as described below.

The topsheet may consist entirely of the multi-component fibres according to the invention, the topsheet may also be a conventional topsheet manufactured from a wide range of materials such as woven and nonwoven materials (e.g. a nonwoven web of fibers). Suitable woven and nonwoven materials can be comprised of natural fibers (e.g. wood or cotton fibers), synthetic fibers (e.g. polymeric fibers such as polyesters, polyamides, polypropylene or polyethylene fibers) or from a combination of natural and synthetic fibers, with the multi-component fibers according to the invention mixed with the above-mentioned fibers. When the topsheet comprises a nonwoven web, the web may be manufactured by a wide number of known techniques. For example, the web may be spun-bonded, carded, wet-laid, melt-blown, hydroentangled, combinations of the above or the like.

The topsheet may comprise at least 50% by weight, preferably at least 65% by weight and most preferably at least 70% by weight of multi-component fibers. At lower ratio multi-component fibers, said fibers may be concentrated at the wearer-facing side of the topsheet, in order to increase the thermo-regulating effect of said fibers.

Figure 5:
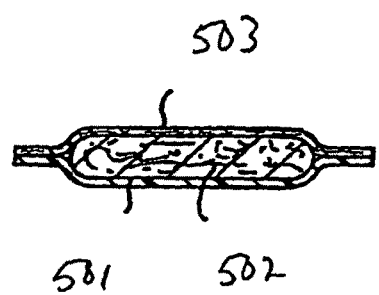

FIG. 5 discloses a cross-section of the absorbent article in FIG. 4. The bottom sheet 501 may consist of a flexible film, for example a plastic film. Examples of plastic materials in the film are polyethylene (PE), polypropylene (PP), polyester or some other suitable material, such as a hydrophobic nonwoven layer or a laminate of a thin film and a nonwoven material. These types of material are often used in order to achieve a soft and textile-like surface on the bottom sheet 501. The bottom sheet 501 can be breathable, so that it permits vapour to pass through while also preventing penetration by liquid. The breathable materials can consist of porous polymer films, nonwoven laminates produced from spunbonded and meltblown layers, and laminates produced from porous polymer films and nonwoven materials.

The bottom sheet can have an adhesive attachment in the form of beads of adhesive, for example, on the side of the bottom sheet that faces away from the upper layer, to enable them to be secured in panties, underpants or knickers. A release material may be applied on top of the adhesive in order to protect the adhesive when the product is not in use.

The absorbent product can also comprise an absorbent core 502 or structure between the top sheet 503 and the bottom sheet 501. The absorbent core 502 can be constructed from one or more layers of cellulose fibres, for example cellulose fluff pulp, airlaid, dry defibrillated or compressed pulp. Other materials that can be used include, for example, absorbent nonwoven material, foam material, synthetic fibre material or peat. Apart from cellulose fibres or other absorbent materials, the absorbent core can also comprise superabsorbent materials, so-called SAP (superabsorbent polymers), which are materials in the form of fibres, particles, granules, films or the like. Superabsorbent polymers are inorganic or organic materials that are capable of swelling in water and are insoluble in water, which exhibit the capacity to absorb at least 20 times their own weight of an aqueous solution containing 0.9% by weight of sodium chloride. Organic materials that are suitable for use as a superabsorbent material can include natural materials such as polysaccharides, polypeptides and the like, as well as synthetic materials such as synthetic hydrogel polymers. Such hydrogel polymers can include, for example, alkaline metal salts of polyacrylic acids, polyacrylamides, polyvinyl alcohol, polyacrylates, polyacrylamides, polyvinyl pyridines and the like. Other suitable polymers include hydrolysed acrylonitrile-grafted starch, acrylic acid-grafted starch, and isobutylene maleic acid anhydride co-polymers and mixtures thereof. The hydrogel polymers are preferably readily cross-linked to ensure that the material remains essentially insoluble in water. The preferred superabsorbent materials are also surface cross-linked so that the external surface or the sheath of the superabsorbent particle, fibre, sphere, etc., has a higher cross-linking density than the inner part of the superabsorbent. The proportion of superabsorbents in an absorbent core can be between 10 and 90% by weight, or preferably between 30 and 70% by weight.

The absorbent core can comprise layers of different materials with different characteristics with regard to their ability to receive liquid, liquid distribution capacity and storage capacity. The absorbent core is more often than not extended in the longitudinal direction and can, for example, be rectangular, T-shaped or hourglass-shaped. An hourglass-shaped core is wider in the front and rear parts than in the crotch part, in order to provide effective absorption, at the same time as the design makes it easier for the product to be formed close to and around the wearer, thereby providing a better fit around the legs.

The absorbent product can also include a transport layer between the top sheet and the absorbent core. The transport layer is a porous, flexible material and can comprise one or more of the following: airlaid, wadding, tissue, carded fibre web, superabsorbent particles or superabsorbent fibres. A transport layer has a high instantaneous capacity to receive liquid and is able to store liquid temporarily before it is absorbed by the subjacent absorbent core. The transport layer can cover the whole or parts of the absorbent core.

The top sheet, the bottom sheet and any interjacent materials are sealed at the edges of the product, which can be effected by thermal sealing, for example, or by some other conventional means.

The absorbent product can also comprise wings on its sides. It can also comprise elastic in order to provide better contact with the body when the product is being worn, and also to reduce leakage.

Components of the absorbent article which advantageously may comprise or entirely consist of the multi-component fibers according to the invention are side-panels, belts and other components which are in contact with the wearers skin during use of the absorbent article.

A textile material comprising multi-component fibres according to above is also disclosed according to the present invention. The textile material is preferably used in clothing. The thermo regulating multi-component fibres are especially interesting to use in sportswear, work wear and underwear. In this type of applications the multi-component fibres of the invention can also be mixed with other types of fibres like synthetic fibres, cotton, wool and viscose. This may be an advantage regarding the good moisture transporting and/or absorption properties of the latter type of fibres, contributing to the wear comfort. Clothing also includes health-care products, such as drapes, gowns, face masks and hats, linings in jackets etc.

All features related to the multi-component fibres can also apply to the fibres in the fabric, in the absorbent article and in the textile material.

When phase change material is used in multi-component fibres, the strength of the fibres may be lower compared to fibres not comprising phase change material. For improving the strength of for example a nonwoven material comprising the multi-component fibres according to the present invention, fibres having a higher strength could be mixed with the multi-component fibres according to the present invention, when producing a nonwoven material.

The same would apply when the multi-component fibres are used in a textile material. When producing yarns for a textile material, some of the filaments used for the yarn production could be filaments, which are stronger than the filaments comprising the phase change material.

Figure 6:
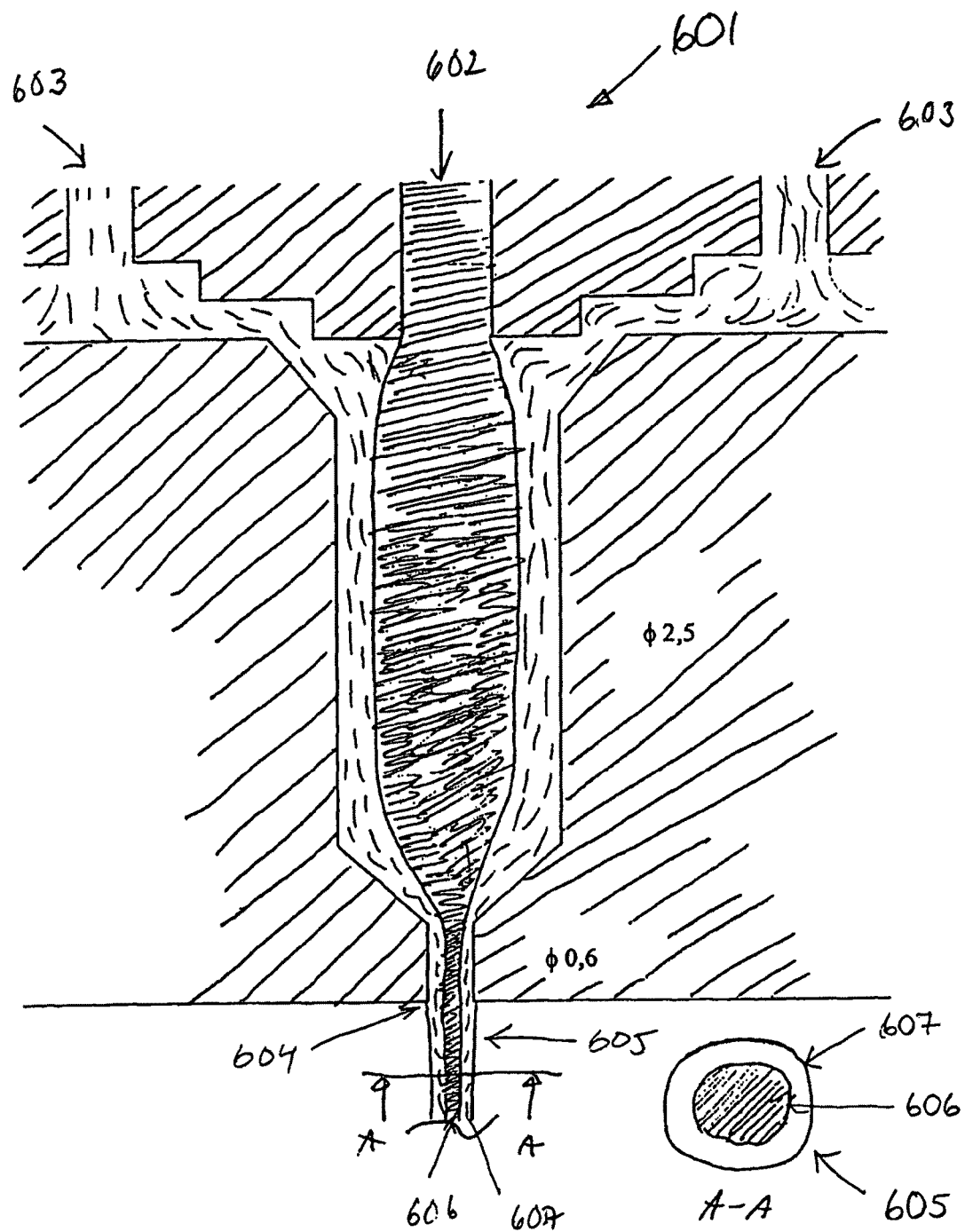
FIG. 6 shows a schematic illustration of a cross section of a downstream part of a spinneret designed for core/sheath bi-component fibres.

Further, the present invention relates to a method of producing a multi-component fibre 605, see FIG. 6, in which a section of a spinneret plate assembly is shown, comprising at least two elongated fibre bodies 606, 607, wherein a first fibre body 606 consists of a first material 602 and a second fibre body 607 consists of a second material 603 and encloses the first fibre body 606, wherein the method comprises:

a) to prepare a first material 602 by mixing a phase change material with at least a viscosity modifier in molten form,
b) to cool the mixture into a solidified mixture,
c) to process the solidified mixture to be in a particulate form,
d) to provide a second material 603,
e) to introduce the first 602 and second 603 materials to a fibre extrusion spinneret plate assembly; and
f) to extrude the first 602 and second 603 materials so as to form a multi-component fibre 605, wherein the second material 603 encloses the first material 602.

All steps are not shown in the Figure.

All the materials defined above may be used in the method of producing multi-component fibres according to the present invention.

The present invention will now be described by the following examples.

Experimental Section

Methods

Density is measured according to ISO 1183-2.

Melt Flow Rate (MFR)

The ability of the polymer melts to flow through a capillary die under pressure was measured according to ISO 1133. MFR gives information about both the molecular weight and the processability of the polymers, The Melt Flow Rate (MFR) is defined as the weight of polymer in grams flowing during 10 minutes through a capillary of specific diameter and length by a pressure applied via prescribed alternative gravimetric weights for alternative prescribed temperatures. Measurements in this work were made at 190° C. using a weight of 21.6 kg, using a capillary of diameter 2.095 mm and length 8.0 mm.

Rheological Evaluation

Rheological testing was performed by means of a Bohlin Controlled stress cone-and-plate rheometer (CS Melt) in oscillating mode (sinusoidal shear strain amplitude was 1%). Plate diameter was 25 mm and Cone angle 5.4°. The sample chamber was purged with nitrogen during heating and testing. In this way curves showing the magnitude of the complex viscosity (in units of Pascal seconds (Pas), vs. angular frequency, in units of radians per second (rad/s)) were recorded.

DSC Analysis

Thermal properties were studied by means of a differential scanning calorimeter, DSC 7 from Perkin Elmer. In the first scan the sample was heated from 0° C. to 50° C. at 10° C./min. After annealing at this temperature for 1 minute the sample was cooled at 5° C./min. to 0°. The heating rate in the second scan was 10° C./min. If not otherwise stated peak melting points and heat of fusion (calculated from the area under the melting peak and the sample weight) refers to the second scan from 0 to 50° C. The heat of fusion, in units of Joule per gram (J/g), was calculated by means of dividing the melting energy (area under the melting peak) with the sample weight.

Tenacity and Titer

Fibre properties (titer, tenacity and modulus) were evaluated by means of a Vibrodyn (Lenzing) tensile tester. Gauge length was 20 mm and testing speed was 20 mm/min. Samples were conditioned at 20° C. and 65% RH for at least 24 hours before testing. For a given material composition Titer is an indirect measure of the filament diameter and is expressed in units of gram per 1000 or 10000 meter of filament (Tex or dTex, respectively). Tenacity is a measure of filament strength (maximum force sustained by the filament during the tensile test divided by the filament titer) and is expressed in units of cN/Tex. Modulus is a measure of filament stiffness and is calculated as the force at 1% strain divided by the filament titer and is expressed in units of cN/Tex. Elongation is a measure of strain at break.

Preparation of Polymer-Wax Mixtures

Polymer pellets/powder was melted together with wax in a heated baker under slow agitation. The baker was heated to about 180° C. During heating the polymer particles gradually melt and the wax starts to migrate into the particles which gradually swell in size. After some time (5-30 minutes depending on polymer type, polymer particle size and batch size) the swelled polymer particles coalesce into a viscous melt. The polymer-wax mixture was then cooled to room temperature. To further ensure a homogenous mixture of wax and polymer the solid mixture was put in a heated Brabender kneader (180° C.) and was melt homogenized for 5 minutes at 50 rpm. After melt homogenization in the Brabender kneader the material was left to cool where after the solid material was milled into granules with a size of approximately 2-4 mm.

The first material can be produced and then stored before producing the multi-component fibre. Thus, all steps do not have to be performed immediately after each other.

Melt Spinning of Bi-component Fibres

Figure 7:
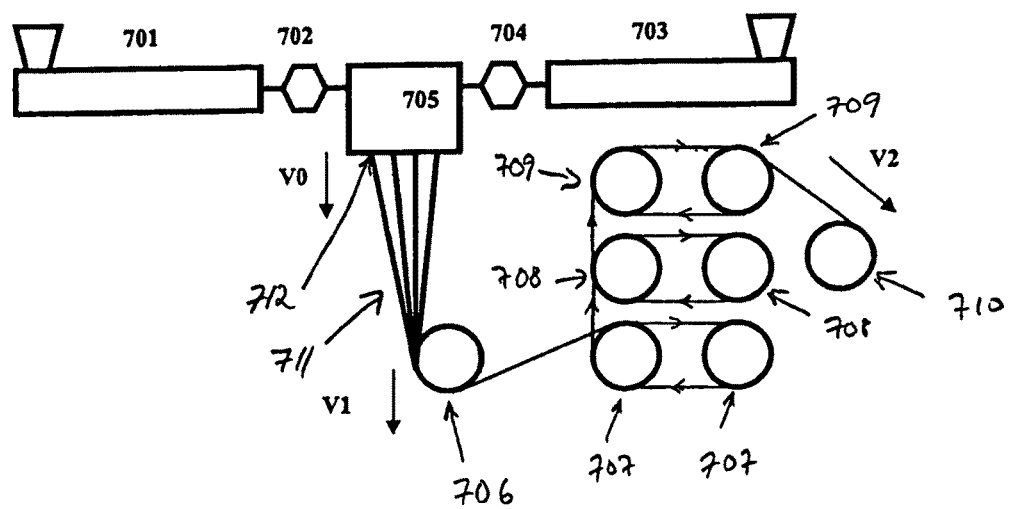
FIG. 7 shows a schematic illustration of an exemplary process for making a multi-component fibre according to the invention.

Melt spinning of fibres was done by means of an ESL lab spin machine, see FIG. 7. The spinneret 705 used had 24 exit holes with a diameter of 0.6 mm. The spinneret 705 was configured for sheath/core bi-component melt spinning, see FIG. 6. The materials for the sheath and core are melted separately by means of two 25 mm extruders 701 and 703, which in turn are feeding two gear pumps 702 and 704, FIG. 7. The two gear pumps 702, 704 feed the spinneret 705. The extruder speed is automatically regulated by a control and feedback system ensuring a constant inlet pressure to the gear pumps 702, 704. A section of the spinneret plate assembly is shown in FIG. 6. A first material 602 and a second material 603 are loaded to the spinneret plate assembly forming a bicomponent fibre 605 having a core 606 and a sheath 607. A cross-section of the bi-component fibre 605 is also disclosed showing the core 606 and the sheath 607.

Hereby follows a more detailed description of the spin machine in FIG. 7. The different elements in FIG. 7 are 701. Extruder for a first material comprising a phase change material
702. Gear pump for a first material comprising a phase change material
703. Extruder for a second material
704. Gear pump for a second material
705. Extrusion die (spinneret)
706. Take-off roller
707. Stretching roller pairs
708. Stretching roller pairs
709. Stretching roller pairs
710. Winder The volumetric flow rate of sheath and core material is given by the respective gear pump speeds. The mass flow rate can be calculated from the volumetric flow rate and the density of the material at the processing temperature. The total (sheath+core material) volumetric flow rate was held constant at 24 cm³/minute in all experiments. By adjusting the gear pump speeds for the sheath and core materials different sheath/core ratios of the filaments can be achieved.

After leaving the spinneret die 705 the filaments 711 are first drawn (diameter reduction) in the melted state (melt drawing) during simultaneous cooling. The draw ratio in the melt drawing step between the spinneret hole 712 and the take-off roller 706 is given by the ratio V1/V0, where V0 is the average melt speed in the spinneret holes 604 (FIG. 6) (total volumetric output divided by the total hole area) and V1 the linear speed of the take-off roller 6. In a second stage, in line with the melt drawing, the solidified filaments are further drawn between several pairs of tempered stretching rollers 707, 708, 709. The draw ratio (DR) in the solid state drawing process is given by DR=V2/V1 where V1 is the linear speed of the take-off roller 706 and V2 the linear speed of the last pair of stretching rollers 709. The fibre strength is significantly increased by the solid state drawing process. In practice there are a multitude of possible variations in the melt spinning process schematically illustrated in FIG. 7. For instance, the solid-state drawing can be done in a separate step. For certain materials (e.g. PET) the solid state drawing step can be omitted if the draw ratio V1/V0 is high enough corresponding to take-off speeds in the range of 5000-7000 meter per minute. In this case a satisfying strength is developed by means of stress induced crystallization already in the melt drawing process.

Phase Change Materials

Examples of some hydrocarbon waxes that can be used as PCM are reproduced in table 1.

TABLE 1

Phase change properties of some common linear chain hydrocarbons

| Phase Change Material | Number of carbon atoms (n) | Melting point (° C.) | Heat of fusion (J/g) |
|---|---|---|---|
| n-octadecane | 18 | 28.2 | 242 |
| n-nonadecane | 19 | 32.1 | 187 |
| n-eicosane | 20 | 36.6 | 246 |
| n-heneicosane | 21 | 40.2 | 200 |

Table 2 shows melting point and heat of fusion of some commercial PCMs available from Rubitherm Technologies GmbH, Berlin, Germany. Observe that the results are from the applicant's own measurements.

TABLE 2

Melting point and heat of fusion of some commercial hydrocarbon PCMs.

| Grade | Melting point [° C.] | Heat of fusion [J/g] |
|---|---|---|
| RT 27 | 28 | 150 |
| RT 31 | 30 | 146 |
| RT 35 | 34 | 150 |

EXAMPLES

Example 1

Different amounts of a viscosity modifier in the form of polyethylene materials (high density polyethylene) were mixed with RT 27 (a hydrocarbon wax manufactured and supplied by Rubitherm GmbH in Germany, see Table 2). The melt flow rate of the polyethylene materials were determined by the method disclosed under "Melt Flow Rate". The mixing of the viscosity modifier and the polyethylene was then made according to the method disclosed under "Preparation of polymer-wax mixtures". Then the viscosity of the different mixtures was investigated according to the method "Rheological evaluation". The angular frequency of 10 rad/s used for the comparison is chosen to roughly correspond to the wall shear rate in the cylindrical duct with a diameter of 2.5 mm as shown in FIG. 6.

Figure 8:
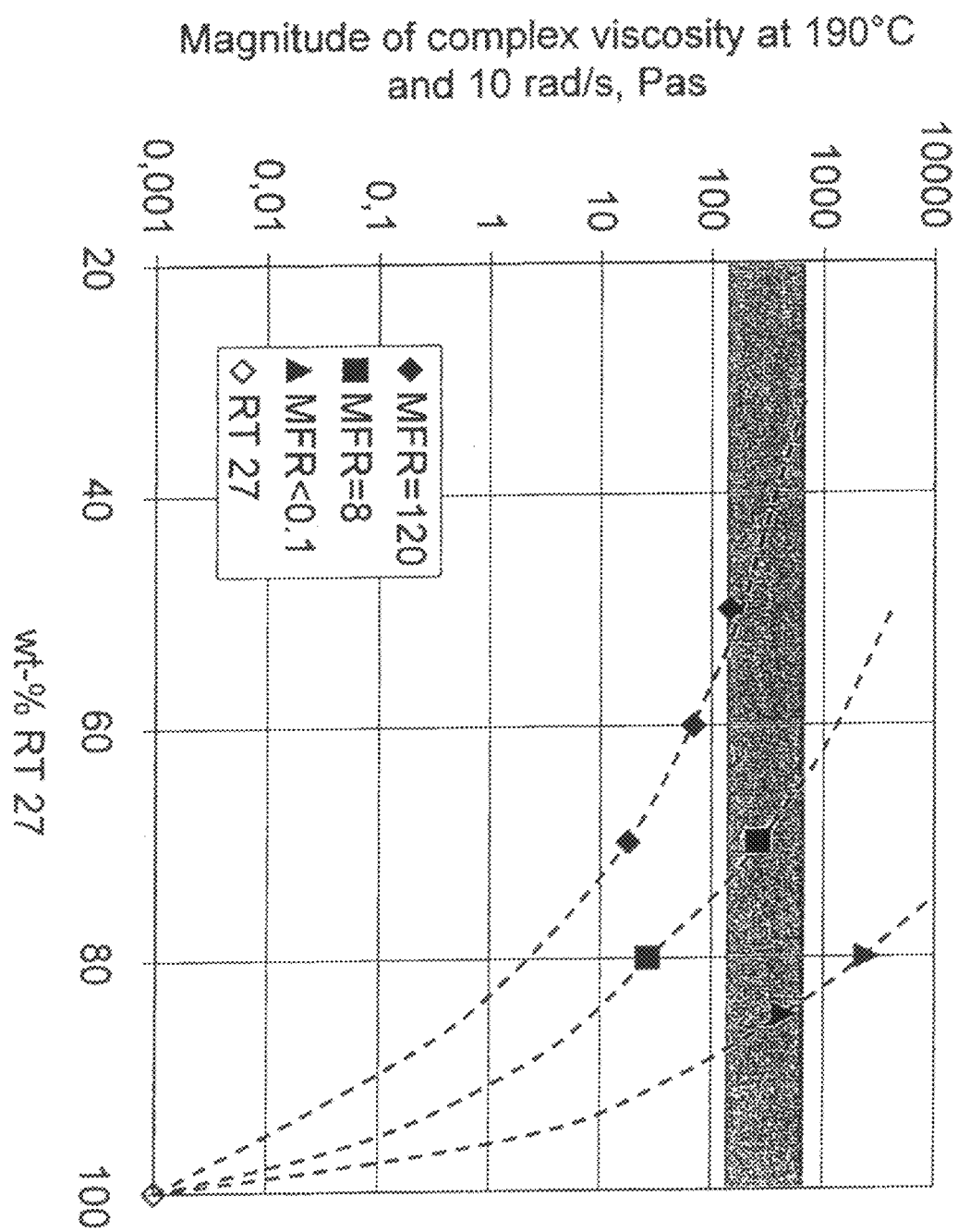
FIG. 8 shows a graph with the Magnitude of complex viscosity at 190° C. and 10 rad/s, versus wt-% RT 27 for different mixtures of polyethylene and RT 27. RT 27 is a paraffin wax produced by Rubitherm GmbH, Berlin, Germany.

The results are shown in FIG. 8 in a graph showing the Magnitude of complex viscosity at 190° C. and 10 rad/s, versus wt-% RT 27. It is shown that the lower melt flow rate of the polyethylene the lower amount of polyethylene will be needed in order to obtain a high viscosity. Thus, a low melt flow rate of the viscosity modifier will increase the viscosity of the first material. For a given polymer, the lower the MFR of the polymeric viscosity modifier the less amount of viscosity modifier is needed to reach a given viscosity.

The shaded area in FIG. 8 gives an indication of shear viscosities of typical polymer grades (e.g. polypropylene, polyamide, polyester) designed for melt spinning at their respective processing temperatures. Again, an angular frequency of 10 rad/s is taken as the reference.

In this specific example (hydrocarbon wax mixed with polyethylene as viscosity modifier), in order for the first material comprising PCM to reach a viscosity in the range of a second material together with which it is to be co-extruded to produce the multi-component fibers of the invention, it is seen that about 50 wt-% of polyethylene with MFR=120 is needed to bring up the viscosity to an acceptable level (shaded area in FIG. 8). If the MFR is lowered to 8 only some 25-30 wt-% is needed. By selecting an ultra high molecular weight polyethylene (UHMWPE) having a MFR <0.1 as viscosity modifier, only some 10-15 wt-% is needed.

However, it was experimentally found that extruding a mixture of RT 27 with 10-15 wt-% UHMWPE through a capillary at a shear rate of 10 s−1 produced severe melt fracture, a phenomena well known to those skilled in the art of polymer extrusion. This was confirmed by bi-component fiber spinning (core/sheath configuration) using a first material comprising PCM (RT 27 mixed with 10-15 wt-% UHMWPE) and a melt spinning grade of PP (HG 245 FB produced by Borealis) as the second material. The molten filaments exiting the spinneret holes severely curled and fiber spinning was not possible. This type of melt fracture is sometimes designated "elastic turbulence" and is presumably caused by the very high elasticity imparted by the very long molecular chains of the HMWPE polymer. There is thus a lower limit on the MFR of the polymer that can be used as viscosity modifier.

Example 2

The PCM efficiency of a polymer comprising PCM with regard to its amount of latent heat (heat of fusion/crystallization) is disclosed in Table 3. The polymer comprising PCM shall correspond to the first material in a multi-component fibre. The hydrocarbon wax RT 31 was mixed with different polyolefins and was made according to the method disclosed under "Preparation of polymer-wax mixtures" and the heat of fusion in the range 0-50° C. was measured by means of DSC according to the DSC analysis disclosed above.

TABLE 3

| Material | wt-% wax (RT 31)[d] | Heat of fusion J/g | PCM Efficiency % |
| --- | --- | --- | --- |
| FS1560 (HDPE)[a] | 65 | 93.7 | 99.4 |
| MFR[e] = 9[e] | 70 | 100.5 | 99.0 |
| Density = 956 kg/m³ | 75 | 108.7 | 100.0 |
|  | 80 | 120.4 | 103.8 |
| BL0521 (HDPE)[a] | 65 | 88.7 | 94.1 |
| MFR[e] = 2.5[e] | 70 | 94.8 | 93.4 |
| Density = 952 kg/m³ | 75 | 102.3 | 94.1 |
|  | 80 | 112.8 | 97.3 |
| FL1500 (HDPE)[a] | 65 | — | — |
| MFR[e] = 8[e] | 70 | — | — |
| Density = 950 kg/m³ | 75 | — | — |
|  | 80 | 105.5 | 91.0 |
| EZP2207 (LLDPE/butene)[b] | 65 | — | — |
| MFR[e] > 65[e,h] | 70 | 85.7 | 84.4 |
| MFR[f] = 0.7[f] | 75 | — | — |
| Density = 922 kg/m³ | 80 | 102.9 | 88.7 |
| Elvaloy 3117 AC (Ethylene-co-butyl acrylate, EBA)[c] | 65 | — | — |
|  | 70 | 85.9 | 84.6 |
| MFR[e] > 80[e,h] | 75 | — | — |
| MFR[f] = 1.5[f] | 80 | 98.2 | 84.6 |
| Density = 924 kg/m³ |  |  |  |
| HE445FB (PP)[a] | 65 | — | — |
| MFR[e] > 80[e,h] | 70 | 84.2 | 82.9 |
| MFR[g] = 11[g] | 75 | — | — |
| Density = 903-910 kg/m³ | 80 | 99.9 | 86.1 |
| RT31[d] | 100 | 145 | 100 |

[a]Available/supplied by Borealis
[b]Available/supplied by Equate
[c]Available/supplied by DuPont
[d]Available/supplied by Rubitherm

TABLE 3-continued

| Material | wt-% wax (RT 31)[d] | Heat of fusion J/g | PCM Efficiency % |
| --- | --- | --- | --- |

[e]g/10 minutes as measured at 190° C. with a 21.6 kg weight according to ISO 1133
[f]g/10 minutes as measured at 190° C. with a 2.16 kg weight according to ISO 1133
[g]g/10 minutes as measured at 230° C. with a 2.16 kg weight according to ISO 1133
[h]not measured by applicant, estimated level
—no experiment made High PCM efficiencies were obtained. Within the polyethylene family the material (FS1560) with the highest density showed the highest efficiency regarding heat of fusion. As may be noted, one of the sample (20% FS1560) exceeds 100% PCM efficiency. This is probably due to small variations in the core/sheath ratio during the spinning process.

Example 3

In the following examples, the core material corresponds to the first material and the sheath material corresponds to the second material according to the present invention.

In this Example a set of bi-component fibres with a sheath/core structure were manufactured as described previously under "Melt spinning of bi-component fibres". The core material was a mixture of 70 wt-% RT27 and 30 wt-% HDPE (FL1500 manufactured by Borealis). The sheath was PP (HG 245 FB manufactured by Borealis). The melt spinning parameters are reproduced in Table 4.

TABLE 4

| | |
| --- | --- |
| Gear pump speed, rpm (CORE) | 3-6 |
| Gear pump speed, rpm (SHEATH) | 7-4 |
| Total flow rate, cm³/min | 24 |
| Take-off roller, m/min | 250 |
| Bottom roller, m/min/Temperature, ° C. | 275/80 |
| Middle roller, m/min/Temperature, ° C. | 625/90 |
| Top roller, m/min | 750 |
| Draw ratio (V2/V1) | 3.0 |
| Extruder Temperatures, ° C. (core/sheath) | 170, 180, 190/190, 200, 210 |
| Gear pump temperature, ° C. (core/sheath) | 210/210 |
| Spinerett temperature, ° C. | 210 |

Some fibre properties are listed in Table 5.

TABLE 5

| Core/Sheath ratio (based on weight) | Wt-% PCM | Heat of fusion [J/g] | Thermal efficiency [%] | Titer [dTex] | Modulus [cN/Tex] | Tenacity [cN/Tex] | Elongation [%] |
| --- | --- | --- | --- | --- | --- | --- | --- |
| 0/100* | 0 | — | — | 11.0 | 270 | 29 | 196 |
| 30/70 | 21 | 11.6 | 37 | 10.5 | 141 | 16 | 126 |
| 40/60 | 28 | 16.2 | 39 | 10.2 | 130 | 11 | 73 |
| 50/50 | 35 | 33.3 | 63 | 10.7 | 126 | 8.4 | 47 |
| 60/40 | 42 | 43.8 | 70 | 9.5 | 142 | 7.6 | 34 |

*Monofilament.

The properties are obtained by the methods disclosed above in the beginning of the experimental section.

The Thermal efficiency of the multi-component fibers is expressed as the ratio $\Delta H_{fiber}/(w_{PCM}*\Delta H_{PCM})*100$. As can be seen from Table 5 the thermal efficiency increases from 37 to 70% by increasing the Core/Sheath ratio from 30/70 to 60/40 corresponding to an increase in PCM content from 21 to 42 wt-% based on the total fiber weight. Thermal efficiencies lower than 60% are considered to be low which means that a substantial part of the added PCM does not take part in the melting process.

It is likely that the low thermal efficiency is due to migration of hydrocarbon wax from the core into the sheath where it is dissolved in the amorphous parts of the polypropylene. This is also due to the fact that polypropylene is soluble in the hydrocarbon wax. If so, thermal efficiency will be partly lost since PCM dissolved in amorphous parts of a polyolefin will have a low tendency to crystallize. For applications of the multi-component fibres of the invention in objects that need regularly laundering (e.g. garments and domestic textiles) it can be assumed that a continued migration of PCM out from the fibres will severely affect their thermal efficiency over time and laundering cycles. For disposable objects (e.g. napkins) migration of PCM might be a negligible problem.

Example 4

In the following Example a set of bi-component fibres with a sheath/core structure were manufactured as described previously under "Melt spinning of bi-component fibres". The core material was a mixture of 35 wt-% RT31, 35 wt-% RT35 and 30 wt-% HDPE (FL1500 manufactured by Borealis). The sheath was PET (GL-BA 6105 with an intrinsic viscosity of 0.61 measured according to ASTM D4603), supplied by TWD Polymere, Germany). The melt spinning parameters are reproduced in Table 6.

TABLE 6

| | |
|---|---|
| Gear pump speed, rpm (CORE) | 4-6 |
| Gear pump speed, rpm (SHEATH) | 6-4 |
| Total flow rate, cm³/min | 24 |
| Take-off roller, m/min | 250 |
| Bottom roller, m/min/Temperature, ° C. | 275/80 |
| Middle roller, m/min/Temperature, ° C. | 625/80 |
| Top roller, m/min | 750 |
| Draw ratio (V2/V1) | 3.0 |
| Extruder Temperatures, ° C. (core/sheath) | 170, 200, 210/280, 300, 290 |
| Gear pump temperature, ° C. (core/sheath) | 230/280 |
| Spinerett temperature, ° C. | 280 |

Fiber properties are listed in Table 7.

TABLE 7

| Core/Sheath ratio (based on weight) | Wt-% PCM | Heat of fusion [J/g] | Thermal efficiency [%] | Titer (dTex) | Modulus (cN/Tex) | Tenacity (cN/Tex) | Elongation (%) |
|---|---|---|---|---|---|---|---|
| 30/70 | 21 | 23.8 | 78 | 10.3 | 388 | 21 | 80.5 |
| 40/60 | 28 | 31.8 | 78 | 14.8 | 244 | 15.9 | 138.4 |
| 50/50 | 35 | 45.9 | 90 | 12.8 | 226 | 13.6 | 165.2 |

The thermal efficiency of the fibers with polyethylene terephthalate (PET) in the sheath (78-90%) is significantly higher than for the fibers with PP in the sheath (37-70%), see example 3 above. This might be explained by the fact that non-polar hydrocarbon waxes are not soluble in the more polar PET and vice versa. For applications of the multi-component fibers of the invention, in which preventing loss of PCM through the sheath by migration/diffusion is important, it is thus preferable that the second material forming the elongated fibre body enclosing the fibre body comprising the phase change material is a fibre forming polymer that does not dissolve in the phase change material at temperatures above the melting point of the fiber forming polymer (or softening point in case of an amorphous polymer). The strength of the fibres is very good for bi-component fibres comprising phase change material in the amounts according to above.

Example 5

In this Example a set of bi-component fibres with a sheath/core structure were manufactured as described previously under "Melt spinning of bi-component fibres". The core material was a mixture of 35 wt-% RT31, 35 wt-% RT35 and 30 wt-% HDPE (FL1500 manufactured by Borealis). The sheath was PET (GL-BA 6105 with an intrinsic viscosity of 0.61 measured according to ASTM D4603), supplied by TWD Polymere, Germany). The melt spinning parameters are reproduced in Table 8.

TABLE 8

| | |
|---|---|
| Gear pump speed, rpm (CORE) | 5 |
| Gear pump speed, rpm (SHEATH) | 5 |
| Total flow rate, cm³/min | 24 |
| Take-off roller, m/min | 150, 300 |
| Bottom roller, m/min/Temperature, ° C. | 175, 325/80 |
| Middle roller, m/min/Temperature, ° C. | 600, 1200/80 |
| Top roller, m/min | 750, 1500 |
| Draw ratio (V2/V1) | 5 |
| Extruder Temperatures, ° C. (core/sheath) | 170, 200, 210/280, 300, 290 |
| Gear pump temperature, ° C. (core/sheath) | 230/280 |
| Spinerett temperature, ° C. | 280 |

Fibre properties are listed in Table 9.

TABLE 9

| Core/Sheath ratio (based on weight) | Wt-% PCM | Heat of fusion [J/g] | Thermal efficiency [%] | Titer (dTex) | Modulus (cN/Tex) | Tenacity (cN/Tex) | Elongation (%) |
|---|---|---|---|---|---|---|---|
| 40/60 | 28 | 33.2 | 82 | 11.7 | 578 | 26.8 | 38.7 |
| 40/60 | 28 | 32.4 | 80 | 7.1 | 570 | 26.2 | 28.2 |

The strength of the multi-component fibres of the invention can further be increased by increasing the draw ratio during melt spinning as shown in this example where two set of fibres are produced with DR=5 and different titer. Materials are the same as in example 4, in which DR was 3 and the tenacity was higher in Example 5 for the core/sheath ratio 40/60 compared to in Example 4 with the same core/sheath ratio 40/60. Fibres with maintained thermal properties are produced with significantly higher stiffness (modulus) and strength (tenacity) when the draw ratio is increased.

Example 6

Polyamide is used as the second material in this example. A set of bi-component fibres with a sheath/core structure were manufactured as described under "Melt spinning of bi-component fibres". The core material was a mixture of 75 wt-% pure n-Eicosane (supplied by Roper Thermals, USA) and 25 wt-% HDPE (FS 1560 manufactured by Borealis). The sheath material was a fiber spinning grade of PA6 (Ultramid BS 703) supplied by BASF, Germany. The measured heat of fusion of the pure n-Eicosane was 240 J/g. The melt spinning parameters are reproduced in Table 10.

TABLE 10

| | |
|---|---|
| Gear pump speed, rpm (CORE) | 4-5 |
| Gear pump speed, rpm (SHEATH) | 6-5 |
| Total flow rate, cm³/min | 24 |
| Take-off roller, m/min | 250 |
| Bottom roller, m/min/Temperature, ° C. | 275/60 |
| Middle roller, m/min/Temperature, ° C. | 625/65 |
| Top roller, m/min | 750 |
| Draw ratio (V2/V1) | 3.0 |
| Extruder Temperatures, ° C. (core/sheath) | 140, 170, 190/240, 270, 280 |
| Gear pump temperature, ° C. (core/sheath) | 240/270 |
| Spinerett temperature, ° C. | 270 |

Fiber properties are reproduced in Table 11.

TABLE 11

| Core/Sheath ratio (based on weight) | Wt-% PCM | Heat of fusion [J/g] | Thermal efficiency [%] | Titer (dTex) | Modulus (cN/Tex) | Tenacity (cN/Tex) | Elongation (%) |
|---|---|---|---|---|---|---|---|
| 34/66 | 25.5 | 48 | 79 | 13 | 160 | 33 | 37 |
| 43/57 | 33 | 65 | 82 | 11.8 | 165 | 27 | 44 |

Also in this example the thermal efficiency is high. This is probably due to that fact that the more polar PA6 is not soluble in non-polar hydrocarbon waxes. For the sake of clarity, the non-polar hydrocarbon waxes are neither soluble in the more polar PA6. The strength of the fibers is good already at a draw ratio of 3. By using a PCM with a high heat of fusion (240 J/g in this example), a HDPE with a high density (956) and low MFR (9), (allowing for a high PCM efficiency and low concentration of HDPE (still facilitating good processability)) as a polymeric viscosity modifier, and a sheath material with low solubility of hydrocarbon wax PCM, strong multi-component fibers (27-33 cN/tex) with a high heat of fusion (48-65 J/g) can be manufactured already at modest loadings of PCM of 25-33 wt-%, based on total fiber weight.

For all multi-component fibres, except where the second material was polypropylene, the thermal efficiency of the multi-component fibres was more than 70%. This might depend on that the polypropylene could be dissolved in the phase change material. Then, the phase change material is not utilised in the same degree. This could also lead to some leakage of the phase change material. This could be a problem for fabrics used in for example clothing, which will be washed and used for a longer time. However, when the fibres are used in disposable articles, this is not necessarily a problem.

It is shown in the Examples that multi-component fibres according to the present invention have good latent heat, good PCM efficiency, good thermal efficiency, high strength and are easy to produce.

The invention claimed is:

1. A multi-component melt-spun fibre, comprising:
at least two elongated melt-spun fibre bodies, wherein a first fibre body consists of a first material comprising a phase change material (PCM) in raw form and a second fibre body consists of a second material and encloses the first fibre body,
wherein the first material is a blend comprising the phase change material and a viscosity modifier selected from polyolefines having a density in the range of 890-970 kg/m³ as measured at room temperature according to ISO 1183-2 and a melt flow rate in the range 0.1-9 g/10 minutes as measured at 190° C. with a 21.6 kg weight according to ISO 1133,
wherein the PCM is present in more than 75% by weight, calculated on the total weight of the first fibre body.

2. The multi-component fibre according to claim 1, wherein the viscosity modifier has a density greater than 920 kg/m³, as measured at room temperature according to ISO 1183-2.

3. The multi-component fibre according to claim 1, wherein the phase change material has a latent heat of at least 100 J/g.

4. The multi-component fibre according to claim 1, wherein the multi-component fibre has a thermal efficiency, as measured by the ratio $\Delta H_{fibre}/(w_{PCM}*\Delta H_{PCM})*100$, which is at least 60 expressed in %.

5. The multi-component fibre according to claim 1, wherein the viscosity modifier is present in less than 25% by weight, calculated on the total weight of the first fibre body.

6. The multi-component fibre according to claim 1, wherein the first material comprises the phase change material and the viscosity modifier in the amount of at least 90% by weight together, calculated on the total weight of the first material.

7. The multi-component fibre according to claim 1, wherein the phase change material is selected from hydrocarbon waxes with a melting point in the range 20-50° C.

8. The multi-component fibre according to claim 1, wherein the phase change material is selected from linear hydrocarbon waxes.

9. The multi-component fibre according to claim 1, wherein the viscosity modifier is polyethylene.

10. The multi-component fibre according to claim 1, wherein the viscosity modifier is polyethylene with a density greater than 950 kg/m$^3$.

11. The multi-component fibre according to claim 1, wherein the fibre has a latent heat of at least 20 J/g as measured with a DSC-method in the range 0° C.-50° C.

12. The multi-component fibre according to claim 1, wherein the fibre has strength greater than 10 cN/tex.

13. The multi-component fibre according to claim 1, wherein the ratio between the viscosity of the first material and the second material fulfils the condition 0.1<Viscosity 1/Viscosity 2<10, where Viscosity 1 is the complex viscosity at the angular frequency of 10 rad/s of the first material comprising PCM and Viscosity 2 is the complex viscosity at the angular frequency of 10 rad/s of the second material, wherein the viscosities are measured at the extrusion temperature used during melt spinning.

14. The multi-component fibre according to claim 1, wherein the second material is a fibre forming polymer that does not dissolve in the phase change material at temperatures above the melting point or the softening point of the fiber forming polymer.

15. The multi-component fibre according to claim 1, wherein the second material comprises polymers selected from polyesters and polyamides.

16. The multi-component fibre according to claim 1, wherein the fibre comprises at least one or more first fibre bodies and at least one or more second fibre bodies.

17. The multi-component fibre according to claim 1, wherein the fibre comprises at least one or more first fibre bodies, at least one or more second fibre bodies and at least one or more third fibre bodies which consists of a third material.

18. A textile material comprising the multi-component fibre according to claim 1.

19. A fabric comprising the multi-component fibre according to claim 1.

20. The fabric according to claim 19, wherein the fabric has a latent heat of at least 10 J/g.

21. An absorbent article comprising the multi-component fibre according to claim 1.

22. The multi-component fibre according to claim 1, wherein the PCM is present in more than 80% by weight, calculated on the total weight of the first fibre body.

23. The multi-component fibre according to claim 1, wherein the multi-component fibre comprises a first material having a PCM efficiency, as measured by the ratio $\Delta H_{mix}/(w_{PCM}*\Delta H_{PcM})*100$, of at least 94.1%.

24. A multi-component melt-spun fibre, comprising:
at least two elongated melt-spun fibre bodies, wherein a first fibre body consists of a first material comprising a phase change material (PCM) in raw form and a second fibre body consists of a second material and encloses the first fibre body,
wherein the first material is a blend comprising the phase change material and a viscosity modifier selected from polyolefines having a density in the range of 890-970 kg/m$^3$ as measured at room temperature according to ISO 1183-2 and a melt flow rate in the range 0.1-9 g/10 minutes as measured at 190° C. with a 21.6 kg weight according to ISO 1133,
wherein the first material has a PCM efficiency, as measured by the ratio $\Delta H_{mix}/(w_{PCM}*\Delta H_{PcM})*100$, of at least 82.9%.

25. The multi-component fibre according to claim 24, wherein the first material has a PCM efficiency, as measured by the ratio $\Delta H_{mix}/(w_{PCM}*\Delta H_{PcM})*100$, of at least 90%.

* * * * *